United States Patent [19]

Hessenthaler

[11] Patent Number: 4,977,937
[45] Date of Patent: Dec. 18, 1990

[54] MULTIPLE ANGLE JOINTER AND PLANER KNIVES

[76] Inventor: George D. Hessenthaler, 585 W. 3900 South, #6, Murray, Utah 84123

[21] Appl. No.: 480,794

[22] Filed: Feb. 16, 1990

[51] Int. Cl.⁵ .................. B27G 13/00; B27C 1/00
[52] U.S. Cl. ........................ 144/241; 144/117 R; 144/218; 144/230; 241/92; 407/61; 407/113
[58] Field of Search ............ 407/60, 61, 113; 241/92; 144/114 R, 117 R, 117 A, 218, 230, 240, 241

[56] References Cited

U.S. PATENT DOCUMENTS

4,260,002  4/1981  Schmalz et al. ............ 407/61
4,271,882  6/1981  Valo ............................ 144/241
4,297,058  10/1981 Armbrust et al. ............ 407/113

Primary Examiner—W. Donald Bray
Attorney, Agent, or Firm—M. Reid Russell

[57] ABSTRACT

The present invention is in a woodworking knife or blade for mounting in a rotating cutterhead of a woodworking machine to either be in alignment with the cutterhead surface or to a table of the woodworking machine whereon wood to be planed or jointed travels. The knife or blade has at least two cutting edges of different sharpness angles ground therein, each cutting edge for machining a surface of a particular type or hardness of wood or related material.

4 Claims, 4 Drawing Sheets

MULTIPLE ANGLE JOINTER AND PLANER KNIVES

BACKGROUND OF THE INVENTION

1. Field of the Invention

The present invention is directed to cutting blades for rotating wood working machines for planing or jointing wood or similar material surfaces and particularly to multi-edged cutting blades.

2. Prior Art

Straight knife tool geometry and knife maintenance has remained essentially unchanged since the advent of jointers and planers. The static state of knife maintenance, principally knife changing, re-setting and shifting, however, was recently significantly improved and perfected by certain revolutionary inventions of the present inventor. It is now possible to quickly, easily and accurately re-set, change or shift jointer or planer knives relative to their specific cutterhead or out-feed table positions in approximately one-tenth the time traditionally required. Which inventions are embodied in, respectively, a U.S. Pat. No. 4,854,051, entitled "Improved Jig for Aligning Cutter Blades", and U.S. patent application, Ser. No. 751,890, entitled "Jig for Aligning Cutter Blades to a Cutterhead". With the advent of these devices the disagreeable, frustrating and time consuming tasks of exactly aligning cutting blades to a machine table or cutterhead outside diameter have been greatly simplified. Additionally, the machine operator need no longer be intimidated by removing and replacing blades in a machine cutterhead.

Recognizing that blades or knifes can now be easily adjusted and replaced in planers, jointers and like woodworking machines, it was recognized by the present inventor that it would be appropriate to design blades that are suited for a particular application. Specifically, it is well known that a woodworking blade or knife optimum sharpness angle will be different for soft and hard woods or various contemporary composite materials such as plywoods and particle boards. Heretofore, the inherent difficulties involved in adjusting and changing cutterhead blades or knives for the wide range of materials which could be shaped or surfaced with such machines precluded the large scale manufacture of special purpose knives. Accordingly, the blades or knives manufactured for such machines have traditionally involved a cutting edge having a sharpness angle that was suitable, but not optimal, for working different types and varieties of wood or materials. Further, such blades or knives have generally involved a single ground edge only, rather than being ground along both edges as is the blade or knife of the present invention. The conventionally accepted "general purpose knife angle has evolved over the years to thirty-six (36) degrees, although angles ranging from as little as twenty-two (22) degrees to as much as forty-eight (48) degrees can be used for machining various woods or wood composite materials.

A recent patent to Grabovac, U.S. Pat. No. 4,658,875, however, does show a double edged blade for use with an improved knife holder. The Grabovac patent, however, does not teach a blade having opposite cutting edges with different sharpness angles as would be optimal for different needs and, of course, does not anticipate a blade having different sharpness angles formed in the same blade edge as does a blade or knife embodiment of the present invention. Neither does Grabovac offer a resharpening feature with his system, which is a valuable economic advantage in considering knife longevity. Rather, he teaches the disposal of dulled or nicked knives and their total replacement with new knives.

Within the woodworking blade or knife art, the present inventor is aware of only a single patent, U.S. Pat. No. 4,628,976, that is directed to a woodworking blade. This blade, however, unlike the present invention, has an edge as the blade end thereof that forms, essentially, a right angle to the blade body.

BRIEF SUMMARY OF THE INVENTION

It is a principal object of the present invention in a multi-angled wood surfacing blade to provide a blade having optimally efficient cutting edges for select hardnesses of wood or various wood base materials, including various plastics.

Another object of the present invention is to provide, a multi-angled wood surfacing blade wherein at least one cutting edge is stepped from one sharpness angle to another.

Still another object of the present invention is to provide, a slip or torque resistant surface for receiving a clamping bar thereagainst.

In accordance with the above objects, the present invention is in a double edged blade or knife for mounting in a cutterhead of a conventional planner, jointer or like woodworking machine. The blade or knife is preferably manufactured from a flat, thin, narrow section of high speed tool steel suitable for wood surfacing that will retain a sharpened edge with minimum nicking, even with extensive use.

The blade opposite edges are ground to different sharpness angles for working different hardnesses of wood. In a first embodiment the opposite edges are ground to different sharpness angles for working, respectively, soft woods and hard woods and composites.

A second blade or knife embodiment provides further versatility by stepping from one angle to another, along at least one edge from a mid-point of the cutting edge. This blade or knife provides, on one edge, a cutting edge that has a sharpness angle that is suitable for soft woods, and is stepped outwardly at a mid-point to a cutting edge that is suitable for hard woods and composites. The pointed end of which cutting edges is common to both cutting edges. The opposite blade cutting edge is preferably ground to a sharpness angle that is optimum for intermediate hardness woods. Of course, the sharpness angle arrangements could be altered, and both blade edges could be stepped at their mid-points, within the scope of this disclosure. Accordingly, with a blade edge which has been stepped to different angles as best suited for specific woods, a jointer operator would be required only to reposition the adjustable jointer fence over whichever section of blade as is best suited for working that particular type of wood. The chief benefit of such modified cutting tool geometry is to take advantage of optimum but varying shearing characteristics that are associated with various species of woods and non-conforming and troublesome grain configurations. All of this versatility is available to the jointer operator in a single blade, without the necessity of changing blades when working different woods.

Further, for facilitating mounting the blade or knife in a cutterhead, the opposite faces thereof are preferably roughened to discourage sliding or torquing out of alignment when tightened.

DESCRIPTION OF THE DRAWINGS

These and other objects and features of the present invention will become more fully apparent from the following description in conjunction with the accompanying drawings.

DETAILED DESCRIPTION

Jointer and planer knives cut most efficiently and provide the greatest longevity when they are ground at different angles best suited for the type of materials being cut. With the recent advent of magnetic knife setting devices for jointers and planers, as set out hereinbelow, knives in these machines can be shifted instead of resharpened to eliminate cutting distortions cased by knife nicks. Independent shop testing has established that a set of knives in these machines can be shifted at least five (5) times before re-sharpening, thus increasing the working life of such knives by a factor of five (5). It is also possible to grind different or multiple "split" angles on alternate knife edges providing improved shearing characteristics for various materials and permitting the knives to become reversible thus increasing knife life by as much as a factor of ten (10). Such increased knife life is possible in conventional, existing jointers and planers using standard, traditional knives with no required retro-fitting or specialty knife holders or other attachments.

Figures 1, 2, 3, 4, 5:
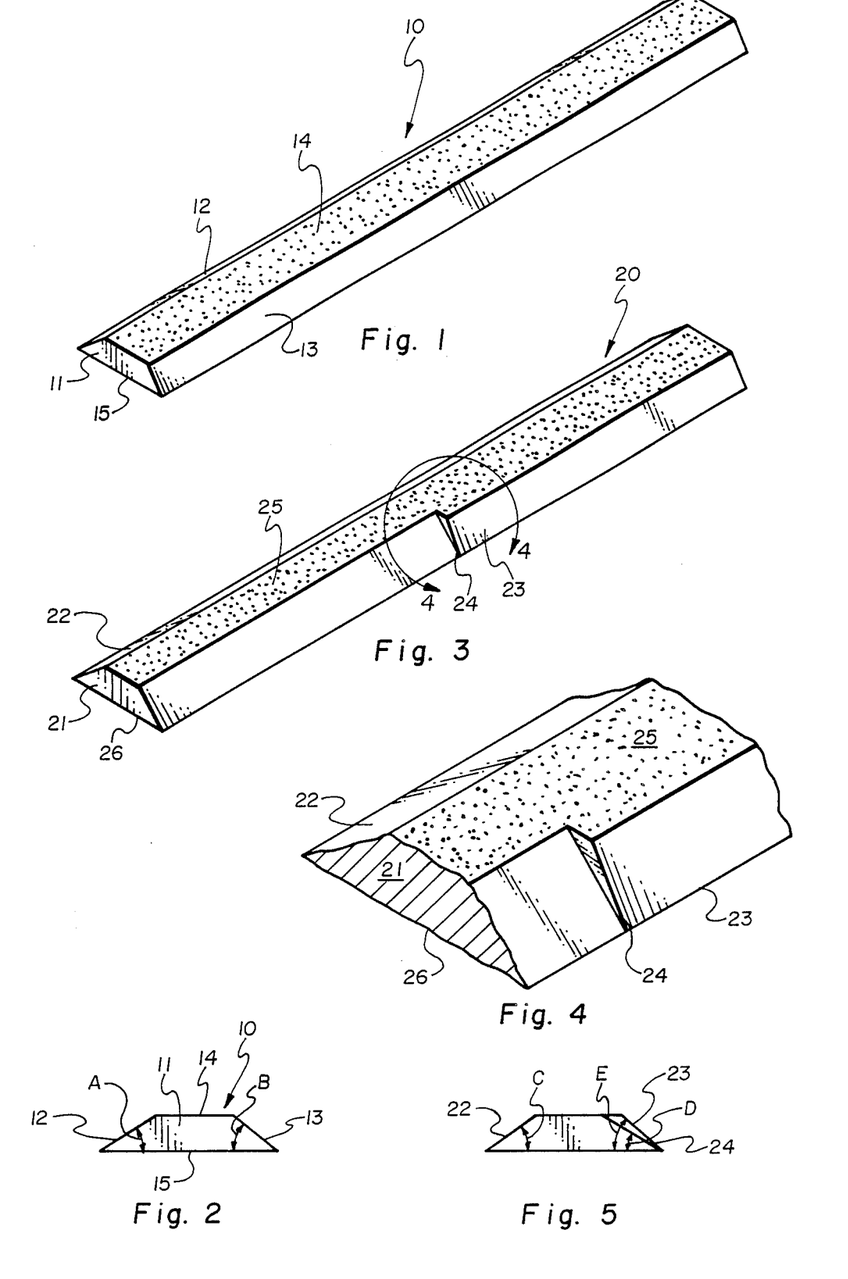
FIG. 1 is a frontal perspective view of a first embodiment of a blade or knife of the present invention.
FIG. 2 is an end view of the blade or knife of FIG. 1.
FIG. 3 is a frontal perspective view of another embodiment of a blade or knife of the present invention.
FIG. 4 is a sectional view taken within the line 4—4 of FIG. 3.
FIG. 5 is an end view of the blade or knife of FIG. 3.

FIG. 1 shows a first embodiment of a blade or knife 10 of the present invention, hereinafter referred to as blade. Blade 10 is preferably manufactured from a steel that is suitable for grinding to an edge and will maintain that edge for a suitable period of time when mounted in a rotating cutterhead of a planer, jointer, or the like, with minimum nicking. Knife blades that are suitable for grinding are commercially available in a wide variety of types of steel and hardness. The present invention is suitable for application to any steel knife stock provided the optimum blade sharpness angles for a type of wood that the blade is for use with may vary with steel hardness. A summary chart, set out later herein, shows tests of blades manufactured from different blade stock and their utilization to plane different type of woods and composites over time. This summary chart demonstrates that with a preferred steel the knife will retain an edge and not nick when ground to a sharpness angle for the particular type of material it is to be used on. A tungsten steel of 62 Rockwell hardness, was used for blade 10.

Blade 10 is formed from a thin, flat rectangular section of knife stock 11 by grinding the opposite edges thereat into cutting edges 12 and 13, respectively. Shown best in FIG. 2, the blade 10 cutting edge 12 is ground to have a sharpness angle A, and cutting edge 13 is ground to have a sharpness angle B. In this embodiment, angle A is an angle that will produce a greatest cutting efficiency for jointers and planers machining flat true surfaces on soft woods. In practice, an angle A of thirty-two (32) degrees was selected for machining soft woods such as pine, fir, spruce and alder, for example.

Angle B of blade 10 of FIG. 2 is shown as having a sharpness angle of thirty-eight (38) degrees which blade angle was selected for machining intermediate and hard woods. Such intermediate woods, for example, include walnut and cherry, and some hard woods include hard rock maple, hickory, cocobolo and bird's eye hard maple.

For blade 10 that is also shown in the summary chart, by properly radially mounting these blades in a cuttinghead, an operator can optimally machine essentially all woods that are suitable for machine surfacing in a planer, jointer, or the like. Such blade positioning is set out in detail hereinbelow with reference to FIGS. 7 through 10.

For providing a secure and stable blade 10 mounting in a planer of jointer cuttinghead, the top and bottom blade faces, 14 and 15, respectively, are preferably roughened to provide slip resistant surfaces. Such roughening can be accomplished by appropriately covering the blade ground edges and grit or sand blasting one or both of the blade upper and lower faces.

FIGS. 3 through 5 show another or second embodiment of a blade or knife 20 that is shown in the summary chart, and is hereinafter referred to as blade 20. Like blade 10, blade 20 is ground into cutting edges along opposite edges thereof. At least one cutting edge of blade 20, however, includes a central stepped portion, whereat the sharpness angle is stepped to a different angle. Blade 20, like blade 10, is fabricated from a section of steel 21 that is suitable for forming a woodworking blade.

Blade 20, as shown in FIG. 5, is ground along one edge 22 to an angle C, and as shown in FIGS. 3 through 5, an opposite blade edge 23 is ground so as to be stepped upwardly at 24 from a lesser sharpness angle D to a greater sharpness angle E. By including different sharpness angles to the cutting edges of blade 20, cutting edges are provided that are suitable for planing, as in a planer or jointer, different hardnesses of wood with the same blade edge. Shown in FIG. 5, angle D of cutting edge 23 is a lesser angle, such as thirty (30) degrees, that is suitable for working soft woods, like those set out above with respect to blade 10. Angle C of cutting edge 22 is shown as an angle of thirty-five (35) degrees, that is preferred for working an intermediate or medium hardness of wood, such as walnut, cherry, and red or white oak. Angle E of cutting edge 23 is stepped outwardly at 24 and is ground to a sharpness angle of forty-one (41) degrees, which angle is suitable for working hard woods like those set out above relative to sharpness angle B of blade 10. While not shown, it should be understood that, within the scope of this disclosure, cutting edge 22 could also be stepped from one sharpness angle to another, providing thereby four (4) different sharpness angles for optimally working four (4) or more different wood hardnesses.

Like blade 10, the top and bottom blade faces 25 and 26, respectively, are preferably roughened to increase friction when a mounting screw, or the like, is tightened thereagainst.

Utilization, in turn, of the different stepped sharpness angles of cutting edge 23 of blade 20, requires that a fence of a woodworking machine, not shown, be positioned at a right angle to the end of the sharpness angle D or E section of cutting edge 23. When the blade portion of sharpness angle E is used for planing hard woods, the fence is positioned at the blade end, when utilizing the sharpness angle D portion of the blade. The fence is positioned over or just past the blade stepped section 24. The blade 20 can be turned and reset to a cutterhead, as will be described later herein with respect to FIGS. 7 through 10, such that cutting edge 22 extends from the cutterhead for working woods of intermediate hardness. Which blade 10 and 20 positioning to a cutterhead of a planer or jointer is explained hereinbelow.

Where certain cutting edge angles have been set out herein as being essentially optimum or preferred for the different cutting edges of blades 10 and 20, it should be understood that these angles are approximations of select or optimum angles and may vary depending upon the intended blade use, or type and wood hardness, as well as the steel used in the blade fabrication. Accordingly, the present invention should be understood to be in a blade that incorporates two or more different sharpness angles of cutting edges as are appropriate and selected for working different types or hardnesses of woods.

Figure 6:
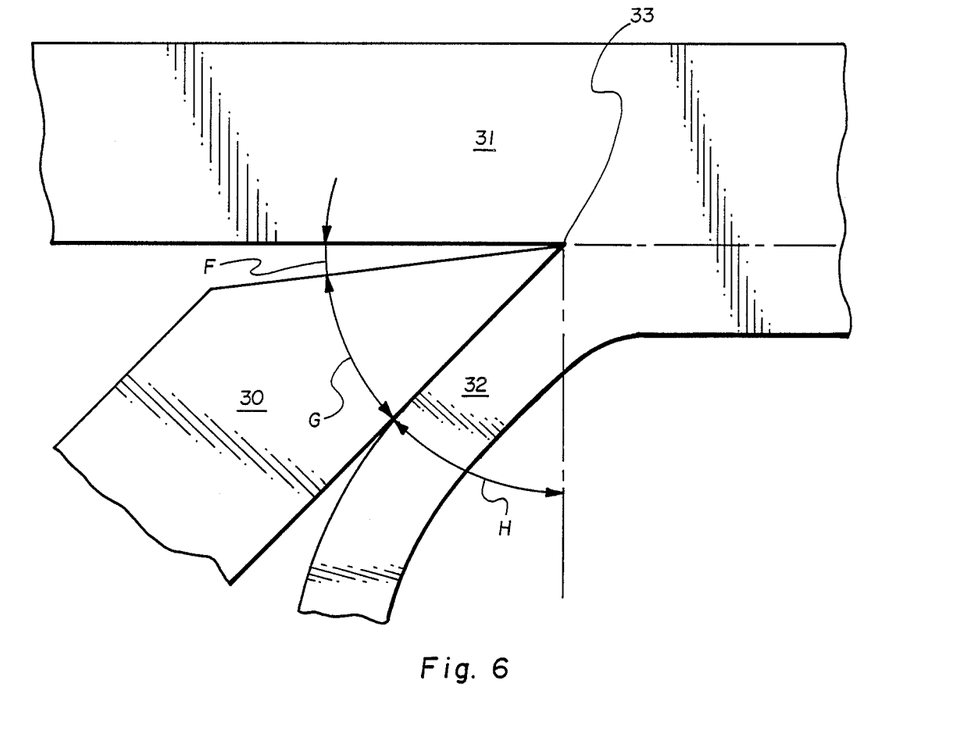
FIG. 6 is a profile schematic view of a section of wood wherefrom a chip is shown being removed by action of a blade or knife.

FIG. 6 shows a section of a blade 30 that is mounted in a turning cutterhead, the blade shearing a section or chip 32 off from a face of a piece of wood 31. FIG. 6 is included to illustrate blade 30 functioning. FIG. 6 shows the relationship of the blade sharpness angle, shown at G, to a clearance angle F and a rake or cutting angle H, that the blade cutting edge 33 makes to a line that is perpendicular to the wood surface. The clearance angle F is, of course, a function of the mounting of the blade in the cutterhead and is, accordingly, established by the manufacturer. Whereas, the cutting angle H is a function of the blade sharpness angle G. A cutting angle that is preferred for soft woods will be a lesser angle than for cutting hard woods. The soft wood putting less strain on the cutting edge end 33, as the blade moves through wood 31 forming chip 32. Whereas, greater sharpness angles are preferred for planing a chip 32 off from a wood of intermediate hardness or a hard wood.

FIG. 6 illustrates chip 32 as being cleanly separated off from the surface of the piece of wood 31. This clean cut indicates a proper blade setting and that the blade has a sharp cutting edge. With continued use the blade cutting edge 33 may dull and chip, particularly where the wood being planed has irregular sections or portions therein, such as knots. Accordingly, with use, a blade cutting edge will wear and chip. The object of the present invention is, by a selection of a preferred blade sharpness angle that is optimum or nearly optimum for a particular wood, thereby extending the useful life of that blade cutting edge. As set out in the summary chart hereinbelow, for blades utilizing cutting edges that are appropriate for working different hardnesses of wood, the blade life for each such blade will be longer than for blades that incorporate an average sharpness angle of cutting edge.

The utility of the blade of the present invention is, at least in part, related to the ease of blade installation and alignment in a rotating cutterhead of a planer, jointer or the like. Jointers and planers are among the oldest class of woodworking machines whose basic functions have not changed since their advent on the woodworking scene. While jointers can be used for other purposes, their primary function is to machine a flat, straight, true surface on the narrow edge of boards. Typically such boards are then edge-glued to provide larger laminated planks of greater widths thus providing greater utility and less waste of the basic resource material. Planers, utilizing similar cutting principles as jointers, are intended to surface the larger flat areas of a board to uniform thickness and flatness.

As set out earlier herein, the present inventor has invented certain blade positioning devices for, respectively, jointers and planers entitled "Improved Jig for Aligning Cutter Blades", hereinafter referred to as "Jointer Jig", U.S. Pat. No. 4,854,051, and "Jig for Aligning Cutter Blades to a Cutterhead", hereinafter referred to as "Planer Jig", U.S. patent application Ser. No. 751,980, that each provide exact blade alignment in a turning cutterhead.

Figure 7:
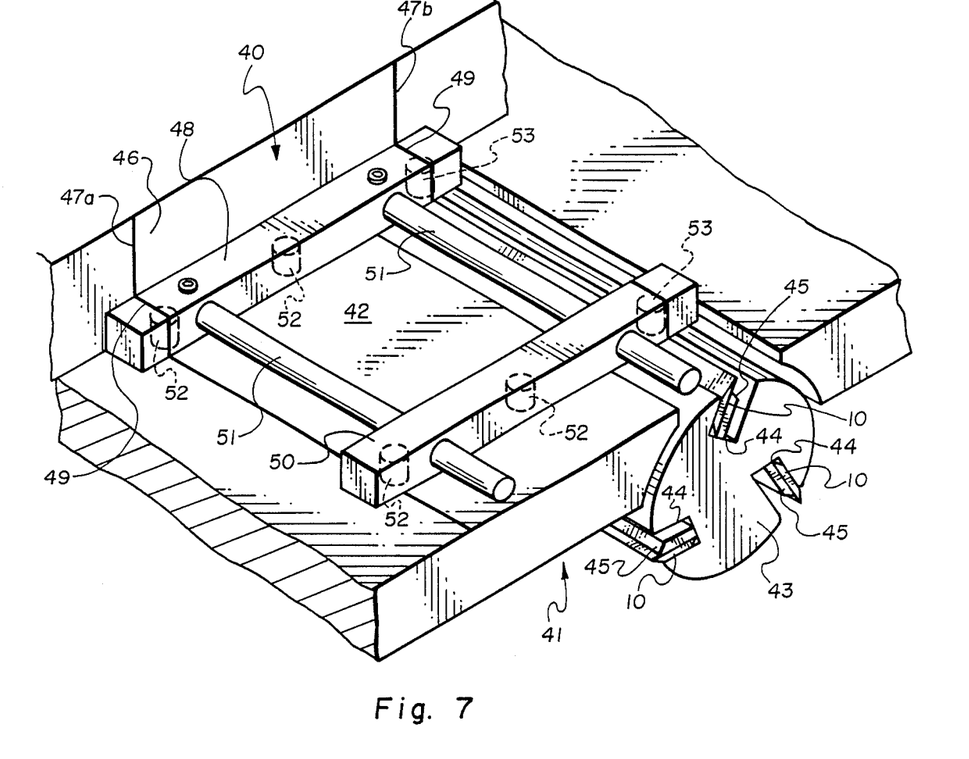
FIG. 7 is a profile perspective view of a jointer jig that is shown set-up for aligning a blade or knife of the present invention relative to a table of a jointer.

FIG. 7 shows a jointer jig 40 that is positioned on an outfeed table 42 of a jointer 41 that includes a rotating cutterhead 43. Cutterhead 43 is shown as slotted at 44 on the bias to the radius of the cylindrical cutterhead, at equidistant points therearound, which slots are each for receiving a blade 10 of the invention maintained therein by a locking bar 45. One or more jack screws, not shown, are provided within each slot 44, each of which is for turning into locking bar 45 so as to wedge it against the blade 10 and slot 44 wall. Each jack screw head is accessible to a wrench that is fitted into the slot for turning to urge the locking bar against the blade 10, wedging it therein.

The jointer jig 40 is for exactly aligning a blade cutting edge to the outfeed table 42. To provide this alignment a movable fence 46 of the jointer 41 includes straight table and cutterhead positioning lines, 47a and 47b, respectively, scribed thereon. Which positioning lines are for alignment with forward and rear placement lines 49 that are scribed across a fence bar 48 of the jointer jig 40. The placement lines 49, are each spaced equidistantly from the fence bar ends. The jointer jig 40 also includes an outfeed table bar 50 that is journaled to slide along parallel rods 51. Which rods 51 are fixed to and extend at right angles from the side of fence bar 48. So arranged, the spacing between the fence and outfeed table bars is adjustable.

Figure 8:
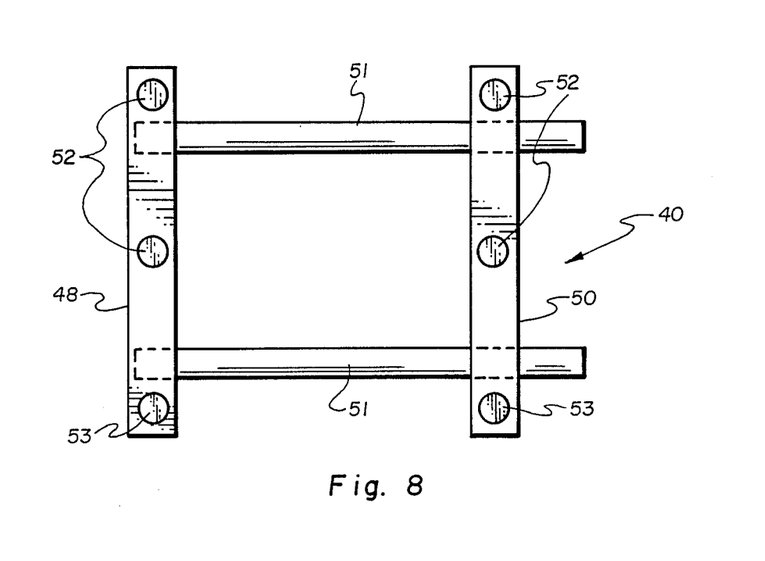
FIG. 8 is a bottom plan view of the jointer jig of FIG. 7.

Shown best in FIG. 8, and in broken lines in FIG. 7, the fence and outfeed table bars, 48 and 50, respectively, include magnets 52 and 53 mounted in the undersurfaces thereof. Which magnets consist of a grouping of spaced apart table magnets 52, that are for releasably holding the jointer jig onto the outfeed table 42. Table magnets 52 can be formed from any conventional magnetic material as is capable of attracting a magnetic material. Additionally, the jointer jig fence and outfeed table bars 48 and 50, respectively, include blade magnets 53 that are laterally centered at a top dead center of the cutterhead 43, which fence bar placement lines 49 are aligned with the positioning lines 47a and 47b. The blade magnets 53 are for attracting and holding a blade 45 at the end of its cutting edge so as to suspend it across and exactly level to the outfeed table 42. This positioning is maintained while the jack screws, not shown, are tightened to mount the blade 10 in place. So arranged, each blade 10 can be quickly and accurately aligned and mounted in cutterhead 43 relative to the surface of the outfeed table 42. To provide a secure holding of blade 10 while the gibe or locking bars, not shown, are tightened, the blade magnets 53 are selected to attract even minimally magnetic material, such as carbide. To provide such magnetic attraction the selected magnets should be very strong, such as rare earth, or like magnets.

Figure 9:
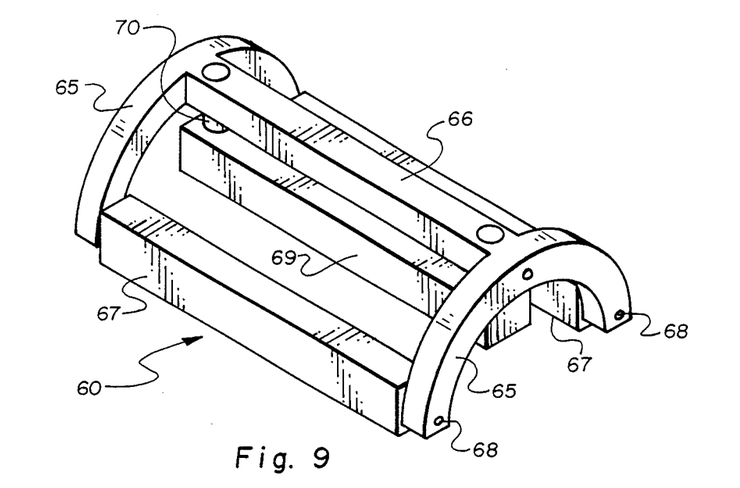
FIG. 9 is a profile perspective view of a planer jig that is shown set-up for aligning a blade or knife of the present invention to a cutterhead of a planer.
Figure 10:
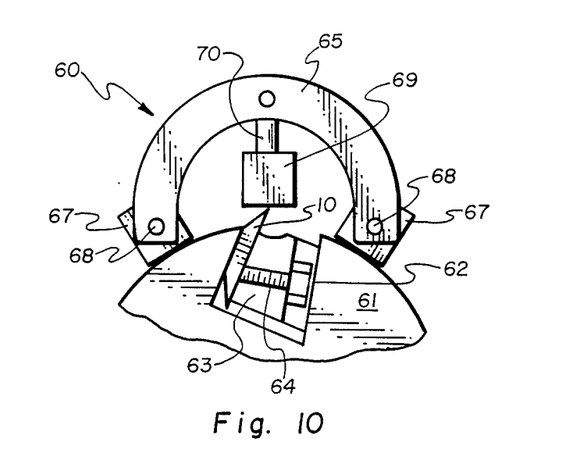
FIG. 10 is a side elevation view of the planer jig of FIG. 9 shown mounted onto a section of a cutterhead, for aligning a blade or knife of the present invention relative to the cylindrical surface of that cutterhead.

Like the jointer jig 40, a planer jig 60, shown in FIGS. 9 and 10 also utilizes magnets for maintaining blade positioning in a cylindrical cutterhead 61 in slots 62. With the blade so maintained, jack screws 64 are turned in a locking bar 63 for mounting the blade at a predetermined angle to that cutterhead surface, as shown in FIG. 10. Cutterhead 61, like cutterhead 43, provides slots 62, wherein are maintained blades 10 at a predetermined angle relative to the surface of that cutterhead. One of which slots is shown in FIG. 10 as including a locking bar 63 that is for wedging against blade 10 when the jack screw 64 is turned appropriately.

Distinct from the jointer jig 40 that provides for aligning a blade to the cutterhead table, the planer jig 60 provides for aligning blade 10 cutting edge to the cutterhead surface, or outside diameter.

Like jointer jig 40, planer jig 60 utilizes permanent magnets for both its attachment to the cutterhead surface and for suspending each blade 10 in each cutterhead slot 62. Shown in FIG. 9, the planer jig 60 includes a pair of hemispherical arches 65 that are maintained in parallel relationship by a bar 66 that attaches at right angles to the center of each of the arches, spanning therebetween. Bar magnets 67 are shown coupled at their ends by pivots 68 to be parallel and extend from the aligned arch ends. The magnetic surfaces thereof, as shown in FIGS. 10, attract to the cutterhead cylindrical surface, pivoting at pivots 68 to fit closely thereto. FIG. 10 shows that the bar magnets 67 are positioned on either side of the cutterhead slot 62 to maintain a blade magnet 69 directly above a blade side of that slot. The blade magnet 69 is suspended from a rod 70 that is secured on its opposite end to the bar 66 and is centered relative to the arches 65. As required, the rod 70 can be arranged to be adjustable for setting a height of the undersurface of blade magnet 69 above the cutterhead surface. So arranged, the blade magnet 69, as shown in FIG. 10, attracts and holds the blade 10 along the end of its cutting edge, which blade is mounted within the slot 62. This allows jack screws 64 to be turned, as with a wrench, to lock the blade 10 in place without disturbing the blade to cutterhead surface positioning. Each blade 10 can thereby be quickly and accurately mounted in cutterhead slots 62, such that the blade cutting edge will exactly align with and project to a desired distance outwardly from the cutterhead surface.

Hereinabove have been set out tooling for quickly and accurately positioning blades in jointer and planer jig cutterheads that is included to illustrate the practicality of the current present invention. Heretofore removal and replacement of blades was too difficult and time consuming for blade rotation and re-alignment to be practical. With the development of the above described tooling, the blades of the present invention are now clearly useful and practical.

Hereinabove has been set out blade construction and installation. Hereinbelow is set out a summary chart wherein the useful life between blades that have been ground to the optimum angle or angles for particular woods are compared against blades that are ground to an average or compromise angle of cutting edge as have been heretofore employed as a general or universal blades. Shown therein the comparison clearly demonstrates the longer useful life for a blade having a cutting edge that is ground to an optimum angle for a particular wood hardness.

| | |
|---|---|
| Class 1 | clear softwood (number 2 common pine) |
| Class 2 | clear hardwood (number 2 common red oak) |
| Class 3 | knotted hardwood (number 2 common red oak with solid knots occurring an average of every 32 inches) |
| Class 4 | (edge glued hardwood segments of 1¾ inch widths) |
| Class 5 | Plywood (¾ inch thick, exterior five ply shop grade) |
| Class 6 | Clear particle board (¾ inch thick, 45 pound industrial grade) |
| Class 7 | Particle board with one side covered with standard thickness (1/16") plastic laminate |
| Class 8 | Bird's eye maple |

To assure that each set of jointer knives was tested to identical criteria the downward pressure and forward feed rate of the boards being edge jointed were fed through the jointer with the use of a standard stock feeder (Delta, model #34-985), on a standard Rockwell six (6) inch jointer, model #37-220. This jointer has a standard 2.250 inch diameter cutterhead with three (3) knives, and ¾ horsepower motor and a standard 0.125 inch knife protrusion from the cutterhead outside diameter. The standard cutterhead spindle speed is 4,500 rpms with a knife cutting arch of 2.50 inches, and produces a rim speed of 13,500 cuts per minute. Each set of three (3) standard steel alloy jointer knives was set to a tolerance of plus or minus 0.001 inch relative to the outfeed table using a standard magna-set jointer knif setting jig. A Carbide Knife Holding Magna-Set was used for resetting solid carbide knives to the same tolerances of plus or minus 0.001 inch. The length of time required for removing existing knives and replacing them with a new set of knives ground to different angles ranged from seven (7) to fifteen (15) minutes per set.

The following sharpness angles were tested:

30, 32, 34, 35, 36, 38, 40, 41, 45, and 48 degrees. Each angle, depending on the type of steel contained in each knife, was tested with a minimum of 1,000 lineal feet (ln. ft.) with a ⅛ inch depth of cut setting. Both the in-feed and outfeed tables were locked in place and regularly checked for slippage as a precaution to assure that the test for each set of knives could remain as true and comparable as possible. A standard ⅛ inch depth of cut was used for each set of knives. Each set of jointer knives was tested to a minimum of 1,000 ln. ft. of various materials while some of the 18% tungsten (T series) knives and carbide knives were tested to more than 10,000 ln. ft. in various materials. Test results for this study included only M2 steel jointer knives.

Wear Ratings and Nick Ratings (Definitions):

1. Wear Rate. The wear or disintegration rate per hour of a jointer knife cutting edge at ⅛ inch depth of cut under steady down pressure and steady powered feed pressure (14 ft. per minute) per 1,000 lineal feet of number 2 common red oak with a moisture content of 7% on a standard six (6) inch jointer. Simplified, the wear rating is "the amount of wear in thousand of an inch per hour at ⅛ inch depth of cut".

$$\text{Wear Rate } (WR) = \frac{.000}{\text{hr.}}$$

2. Nick Rate. Nick rate, as opposed to wear rate, is "the average amount of greatest distortion (read in thousandths of an inch) created in a knife cutting edge below the average wear line over a given length of time (measured as the deepest gouge or nick depth on the cutting edge). The wear rate is the average amount of material removed from the knife cutting edge as compared to the beginning surface of the knife cutting edge before it has been used for cutting).

$$\text{Nick Rate } (NR) = \frac{.000}{\text{hr.}}$$

The following "wear rate" and "nick rate" chart provide graphic comparisons on the reaction the same blade angles have to different materials and how different blade angles react to the same materials.

| Knife Angle | | WEAR RATES AND NICK RATES (STEEL - M2 HIGH SPEED TOOL STEEL) Class of Material Being Cut | | | | | | |
|---|---|---|---|---|---|---|---|---|
| | | #1 | #2 | #3 | #4 | #5 | #6 | #7 |
| 30° | NR | −.006/hr. | −.011/hr. | −.022/hr. | −.021/hr. | −.039/hr. | −.016/hr. | −.035/hr. |
| | WR | .000/hr. | .009/hr. | .012/hr. | .017/hr. | .009/hr. | .016/hr. | .009/hr. |
| 32° | NR | −.006/hr. | −.011/hr. | −.024/hr. | −.011/hr. | −.040/hr. | −.016/hr. | −.035/hr. |
| | WR | .000/hr. | .010/000 | .012/hr. | .010/hr. | .009/hr. | .016/hr. | .021/hr. |
| 34° | NR | −.007/hr. | −.010/hr. | −.022/hr. | −.027/hr. | NOT TESTED | −.017/hr. | NOT TESTED |
| | WR | .000/hr. | .010/hr. | .012/000 | .010/hr. | NOT TESTED | .011/hr. | NOT TESTED |
| 35° | NR | −.006/hr. | −.010/hr. | NOT TESTED | −.010/hr. | −.031/hr. | −.011/hr. | .039/hr. |
| | WR | .0005/hr. | .010/hr. | NOT TESTED | .010/hr. | NOT TESTED | .006/hr. | .021/hr. |
| 36° | NR | −.006/hr. | −.008/hr. | −.028/hr. | −.008/hr. | −.030/hr. | −.009/hr. | −.039/hr. |
| | WR | .000/hr. | .009/hr. | .011/hr. | .009/hr. | .004/hr. | .006/hr. | .009/hr. |
| 38° | NR | −.000/hr. | −.004/hr. | −.018/hr. | −.026/hr. | −.020/hr. | −.009/hr. | −.030/hr. |
| | WR | .000/hr. | .003/hr. | .007/hr. | .009/hr. | .004/hr. | .002/hr. | .012/hr. |
| 40° | NR | −.000/hr. | −.004/hr. | −.011/hr. | −.004/hr. | −.020/hr. | −.006/hr. | −.030/hr. |
| | WR | .000/hr. | .004/hr. | .009/hr. | .004/hr. | .005/hr. | .003/hr. | .008/hr. |
| 41° | NR | −.000/hr. | −.004/hr. | −.011/hr. | −.004/hr. | NOT TESTED | −.006/hr. | −.030/hr. |
| | WR | .000/hr. | .004/hr. | .009/hr. | .004/hr. | NOT TESTED | .003/hr. | .008/hr. |
| 45° | NR | −.000/hr. | −.002/hr. | −.011/hr. | −.019/hr. | −.018/hr. | −.005/hr. | −.021/hr. |
| | WR | .000/hr. | .001/hr. | .005/hr. | .006/hr. | .003/hr. | .003/hr. | .008/hr. |
| 48° | NR | −.000/hr. | −.001/hr. | −.011/hr. | −.001/hr. | NOT TESTED | NOT TESTED | NOT TESTED |

-continued

| | | WEAR RATES AND NICK RATES (STEEL - M2 HIGH SPEED TOOL STEEL) | | | | | | |
|---|---|---|---|---|---|---|---|---|
| Knife | | Class of Material Being Cut | | | | | | |
| Angle | | #1 | #2 | #3 | #4 | #5 | #6 | #7 |
| | WR | .000 hr. | .000 hr. | .002 hr. | .000 hr. | NOT TESTED | NOT TESTED | NOT TESTED |

*Class 8 was not tested.

Hereinabove has been set out a description of two embodiments of blades of the present invention, the individual blades with cutting edges ground to different angles for use in planing different types or hardnesses of wood. It should, however, be understood that the present disclosure is made by way of example only and that variations thereto are possible within the scope of this disclosure without departing from the subject matter coming within the scope of the following claims and reasonable equivalency thereof, which claims I regard as my invention.

I claim:

1. A blade for mounting in a rotating cutterhead of a woodworking machine comprising a narrow rectangular section of steel appropriate dimensions and hardness for forming a blade having parallel long edges and parallel top and bottom faces for installation in a rotating cutterhead of a jointer or planer woodworking machine, that has at least two cutting edges of different sharpness angles ground along said parallel long edges of said blade, and said blade is mounted to expose one said cutting edge as is appropriate for planing a particular type of hardness of wood.

2. A blade as recited in claim 1, wherein at least one of which opposite blade cutting edges is stepped, at approximately a mid-point therealong, from one sharpness angle to another.

3. A blade as recited in claim 1, further including roughening at least one of the blade top and bottom parallel faces.

4. A blade as recited in claim 3, wherein the blade both top and bottom faces are roughened.

* * * * *